(12) United States Patent
Jun et al.

(10) Patent No.: US 11,630,281 B2
(45) Date of Patent: Apr. 18, 2023

(54) LENS MODULE AND CAMERA MODULE INCLUDING THE SAME

(71) Applicant: Samsung Electro-Mechanics Co., Ltd., Suwon-si (KR)

(72) Inventors: Jae Woo Jun, Suwon-si (KR); Jae Ki Eom, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 145 days.

(21) Appl. No.: 17/208,067

(22) Filed: Mar. 22, 2021

(65) Prior Publication Data
US 2022/0066125 A1 Mar. 3, 2022

(30) Foreign Application Priority Data
Sep. 3, 2020 (KR) .................. 10-2020-0112428

(51) Int. Cl.
| | |
|---|---|
| G02B 7/08 | (2021.01) |
| H04M 1/02 | (2006.01) |
| G02B 15/14 | (2006.01) |
| G03B 5/00 | (2021.01) |
| H04N 23/57 | (2023.01) |

(52) U.S. Cl.
CPC ............. G02B 7/08 (2013.01); G02B 15/14 (2013.01); G03B 5/00 (2013.01); H04M 1/0264 (2013.01); H04N 23/57 (2023.01); G03B 2205/0007 (2013.01); H04M 2250/52 (2013.01)

(58) Field of Classification Search
CPC . G03B 7/022; G03B 17/12; G03B 2205/0046
See application file for complete search history.

(56) References Cited

U.S. PATENT DOCUMENTS

| | | | |
|---|---|---|---|
| 11,086,103 B2* | 8/2021 | Jun .................... | F03G 7/065 |
| 11,105,319 B2* | 8/2021 | Miller .................. | G02B 6/3584 |
| 2014/0009631 A1 | 1/2014 | Topliss | |
| 2015/0135703 A1* | 5/2015 | Eddington ............... | G03B 5/00 |
| | | | 60/528 |

(Continued)

FOREIGN PATENT DOCUMENTS

| | | |
|---|---|---|
| JP | 2014-160122 A | 9/2014 |
| KR | 10-0730910 B1 | 6/2007 |

(Continued)

OTHER PUBLICATIONS

Korean Notice of Reason for Rejection dated Oct. 15, 2021 in counterpart Korean Patent Application No. 10-2020-0112428 (9 pages in English, 6 pages in Korean).

*Primary Examiner* — Clayton E. LaBalle
*Assistant Examiner* — Diana Hancock
(74) *Attorney, Agent, or Firm* — NSIP Law

(57) ABSTRACT

A lens module includes a carrier having an internal space, a lens unit including lens groups and installed in the carrier so that at least two of the lens groups are independently movable in a length direction of the carrier, a guide unit including guide members arranged on both side surfaces of the lens groups to guide movement of the movable lens groups, and driving wires connected to each of the guide members and formed of a shape memory alloy, wherein each of the movable lens groups is connected to a pair of guide members disposed on both sides of the carrier.

19 Claims, 18 Drawing Sheets

(56) References Cited

U.S. PATENT DOCUMENTS

| | | | | |
|---|---|---|---|---|
| 2020/0041872 A1* | 2/2020 | Köpfer | .................... | G02B 7/09 |
| 2020/0142161 A1 | 5/2020 | Jun | | |
| 2020/0310224 A1* | 10/2020 | Fang | ........................ | G03B 3/10 |
| 2020/0371409 A1* | 11/2020 | Huang | ................... | G03B 13/34 |
| 2021/0318509 A1* | 10/2021 | Jun | ........................ | G03B 17/17 |
| 2022/0066124 A1* | 3/2022 | Jun | .......................... | G02B 7/08 |

FOREIGN PATENT DOCUMENTS

| | | |
|---|---|---|
| KR | 10-2019-0096133 A | 8/2019 |
| KR | 10-2019-0116808 A | 10/2019 |
| KR | 10-2020-0051354 A | 5/2020 |

* cited by examiner

LENS MODULE AND CAMERA MODULE INCLUDING THE SAME

CROSS-REFERENCE TO RELATED APPLICATIONS

This application claims the benefit under 35 USC 119(a) of Korean Patent Application No. 10-2020-0112428 filed on Sep. 3, 2020, in the Korean Intellectual Property Office, the entire disclosure of which is incorporated herein by reference for all purposes.

BACKGROUND

1. Field

The present disclosure relates to a lens module and a camera module including the same.

2. Description of the Background

Recently, camera modules have been standardly installed in portable electronic devices such as tablet personal computers (PCs), laptop computers, and the like, as well as smartphones, and an autofocusing (AF) function, an optical image stabilization (OIS) function, a zoom function, and the like, have been added to camera modules for mobile terminals.

However, in order to implement various functions, a structure of a camera module has become complicated and a size of the camera module has increased, resulting in an increase in size of the portable electronic device in which the camera module is mounted.

In accordance with growth of the smartphone camera market, attempts at miniaturizing and integrating functions of typical manual cameras, such as an AF function and an optical zoom function with an OIS driving manner have been continuously carried out. Accordingly, a structure of the camera module may be diversified. Therefore, OIS driving manners other than existing OIS driving manners have been demanded.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a lens module includes a carrier having an internal space, a lens unit including lens groups and installed in the carrier so that at least two of the lens groups are independently movable in a length direction of the carrier, a guide unit including guide members arranged on both side surfaces of the lens groups to guide movement of the movable lens groups, and driving wires connected to each of the guide members and formed of a shape memory alloy, wherein each of the movable lens groups is connected to a pair of guide members disposed on both sides of the carrier.

The guide members may be disposed in pairs corresponding to the number of movable lens groups.

The carrier may include an auxiliary guide member having an auxiliary guide hole and disposed on at least one side surface of the lens groups, the auxiliary guide hole being disposed parallel to a movement direction of the movable lens groups to guide movement of the movable lens groups.

The guide members may include a first guide member disposed on one side surface of the lens groups, a second guide member disposed to be overlapped with the first guide member, a third guide member disposed on the other side surface of the lens groups, and a fourth guide member disposed to be overlapped with the third guide member.

The first guide member may have a first inclined guide hole disposed to be inclined in one direction, and the second guide member may have a second inclined guide hole disposed to be spaced apart from the first inclined guide hole and disposed to be inclined to an other direction opposite to the inclined direction of the first inclined guide hole, and the first guide member may have a first opening disposed to face the second inclined guide hole, and the second guide member may have a second opening disposed to face the first inclined guide hole.

The third guide member may have a third inclined guide hole disposed to be inclined in one direction, and the fourth guide member may have a fourth inclined guide hole disposed to be spaced apart from the third inclined guide hole and disposed to be inclined to an other direction opposite to the inclined direction of the third inclined guide hole, and the third guide member may have a third opening disposed to face the fourth inclined guide hole, and the fourth guide member may have a fourth opening disposed to face the third inclined guide hole.

The movable lens groups may each have a coupling protrusion penetrating through the auxiliary guide hole, and the coupling protrusion may be disposed in the first inclined guide hole and the second opening or the second inclined guide hole and the first opening, the first opening and the second opening being disposed to face the second inclined guide hole and the first inclined guide hole, respectively.

The driving wires may include first and second driving wires disposed to cross each other at an upper end of the first guide member and each having one end connected to the upper end of the first guide member, and third and fourth driving wires disposed to cross each other below the first and second driving wires and each having one end connected to a lower end of the first guide member, fifth and sixth driving wires disposed to cross each other at an upper end of the second guide member and each having one end connected to the upper end of the second guide member, and seventh and eighth driving wires disposed to cross each other below the fifth and sixth driving wires and each having one end connected to a lower end of the second guide member, ninth and tenth driving wires disposed to cross each other at an upper end of the third guide member and each having one end connected to the upper end of the third guide member, and eleventh and twelfth driving wires disposed to cross each other below the ninth and tenth driving wires and each having one end connected to a lower end of the third guide member, and thirteenth and fourteenth driving wires disposed to cross each other at an upper end of the fourth guide member and each having one end connected to the upper end of the fourth guide member, and fifteenth and sixteenth driving wires disposed to cross each other below the thirteenth and fourteenth driving wires and each having one end connected to a lower end of the fourth guide member.

Each of the first to fourth guide members may guide the movement of the movable lens groups while ascending and descending in a vertical direction of the carrier.

The carrier may include a bottom plate and a cover plate disposed to face the bottom plate, and each of the bottom plate and the cover plate may include a mounting portion installed with an installation bar to which ends of the driving wires are connected.

One end of each driving wire may be connected to a corresponding connection hole provided in one of the first to fourth guide members, and an other end of the driving wire may be connected to a corresponding installation bar.

The lens groups may include a first lens group fixed and installed on one side of the carrier, a second lens group disposed behind the first lens group and movable in an incident direction of light, and a third lens group disposed behind the second lens group and movable.

The second lens group may be connected to the first and third guide members and movable in the length direction of the carrier according to ascending and descending of the first and third guide members, and the third lens group may be connected to the second and fourth guide members and movable in the length direction of the carrier according to ascending and descending of the second and fourth guide members.

The second lens group may have coupling protrusions disposed to penetrate through auxiliary guide holes of auxiliary guide members provided in the carrier, and the third lens group may have coupling protrusions disposed to penetrate through the auxiliary guide holes of the auxiliary guide members provided in the carrier.

The auxiliary guide member may be detachably installed to the carrier.

The lens module may further include cover members coupled to the carrier to be disposed on the both side surfaces of the lens groups.

The cover members may each include a protrusion portion for reducing a contact area with the guide members when the guide members ascend and descend.

A camera module may include a reflecting module configured to change a path of incident light, and the lens module through which the light whose path is changed by the reflecting module passes.

A portable electronic device may include front and rear major surfaces facing each other in a thickness direction of the portable electronic device, and two or more camera modules, one or more of which is the camera module having the lens module, wherein the lens groups of the one or more camera modules having the lens module may be disposed along an optical axis perpendicular to the thickness direction.

In another general aspect, a lens module includes a carrier, a lens group disposed in the carrier and movable in an optical axis direction relative to the carrier, guide members disposed on opposing sides of the carrier connected to the lens group, and driving wires comprised of shape memory alloy and connected to the carrier and the guide members to drive the guide members in a direction crossing the optical axis direction, wherein the lens group moves in the optical axis direction in response to the guide members driven in the direction crossing the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
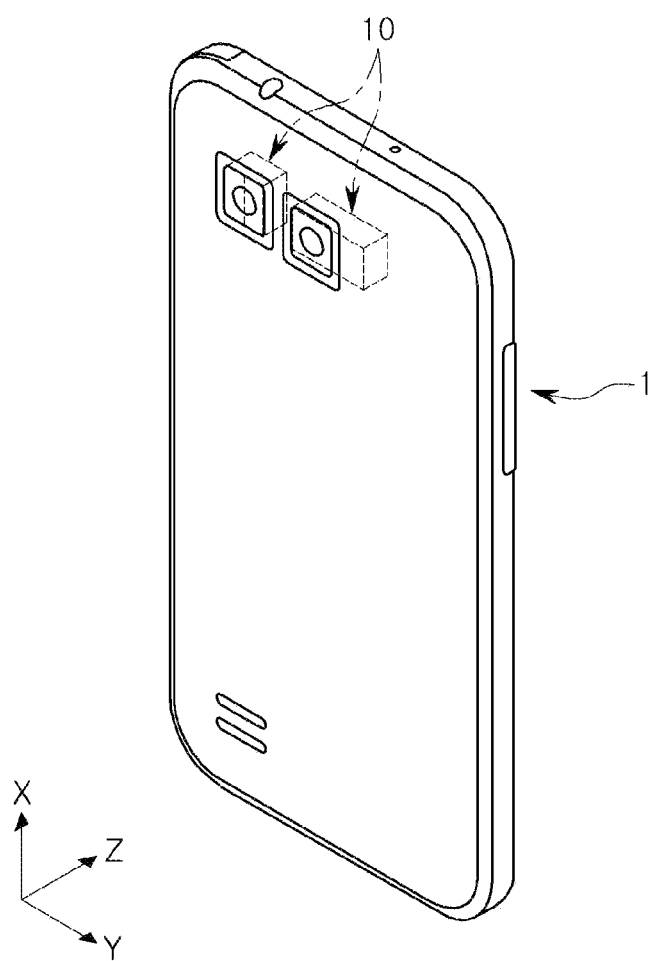
FIG. 1 is a perspective view illustrating a portable electronic device according to one or more example embodiments of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

An aspect of the present disclosure may provide a camera module in which a lens may be moved more smoothly.

FIG. 1 is a perspective view illustrating a portable electronic device according to one or more example embodiments of the present disclosure.

Referring to FIG. 1, a portable electronic device 1 according to an example embodiment of the present disclosure may be a portable electronic device such as a mobile communications terminal, a smartphone, a tablet personal computer (PC), or the like, in which a camera module 10 is mounted.

As illustrated in FIG. 1, the portable electronic device 1 may be mounted with two camera modules 10 to capture an image of a subject.

In the present example embodiment, a first camera module 10 may include a plurality of lenses, and an optical axis of each of the lenses may be directed toward a direction perpendicular to a thickness direction (a Z-axis direction or a direction from a front surface of the portable electronic device to a rear surface thereof or an opposite direction to the direction from the front surface of the portable electronic device to the rear surface thereof) of the portable electronic device 1. For example, in a Y-axis direction.

As an example, an optical axis of each of a plurality of lenses included in a second, other, camera module 10 may be formed in the thickness direction (the Z-axis direction) of the portable electronic device 1.

Therefore, even though the camera module 10, including the first and second camera modules, has functions such as an autofocusing (hereinafter, referred to as AF) function, a zoom function, and an optical image stabilization (hereinafter, referred to as OIS) function, a thickness of the portable electronic device 1 may not be increased. Therefore, the portable electronic device 1 may be miniaturized and thinned.

The camera module 10 according to an example embodiment of the present disclosure may have at least one of the AF function, the zoom function, and the OIS function.

Since the camera module 10 having the AF function, the zoom function, the OIS function, and the like, needs to include various components, a size of the camera module may be increased as compared to a general camera module.

When the size of the camera module 10 is increased, a problem may occur in miniaturizing the portable electronic device 1 in which the camera module 10 is mounted.

For example, when the number of stacked lenses in the camera module is increased for the purpose of the zoom function and a plurality of stacked lenses are formed in the camera module in the thickness direction of the portable electronic device, the thickness of the portable electronic device may also be increased depending on the number of stacked lenses. Therefore, when the thickness of the portable electronic device is not increased, the number of stacked lenses may not be sufficiently secured, such that zoom performance may be deteriorated.

In addition, an actuator moving a lens group in an optical axis direction or a direction perpendicular to the optical axis needs to be installed in order to implement the AF function and the OIS function, and when the optical axis of the lens group is formed in the thickness direction of the portable electronic device, the actuator moving the lens group needs also to be installed in the thickness direction of the portable electronic device. Therefore, the thickness of the portable electronic device may be increased.

However, in the camera module 10 according to an example embodiment in the present disclosure, the plurality of lenses are arranged so that the optical axis of each of the plurality of lenses is perpendicular to the thickness direction of the portable electronic device 1. Therefore, even though the camera module 10 having the AF function, the zoom function, and the OIS function is mounted in the portable electronic device 1, the portable electronic device 1 may be miniaturized.

Figure 2:
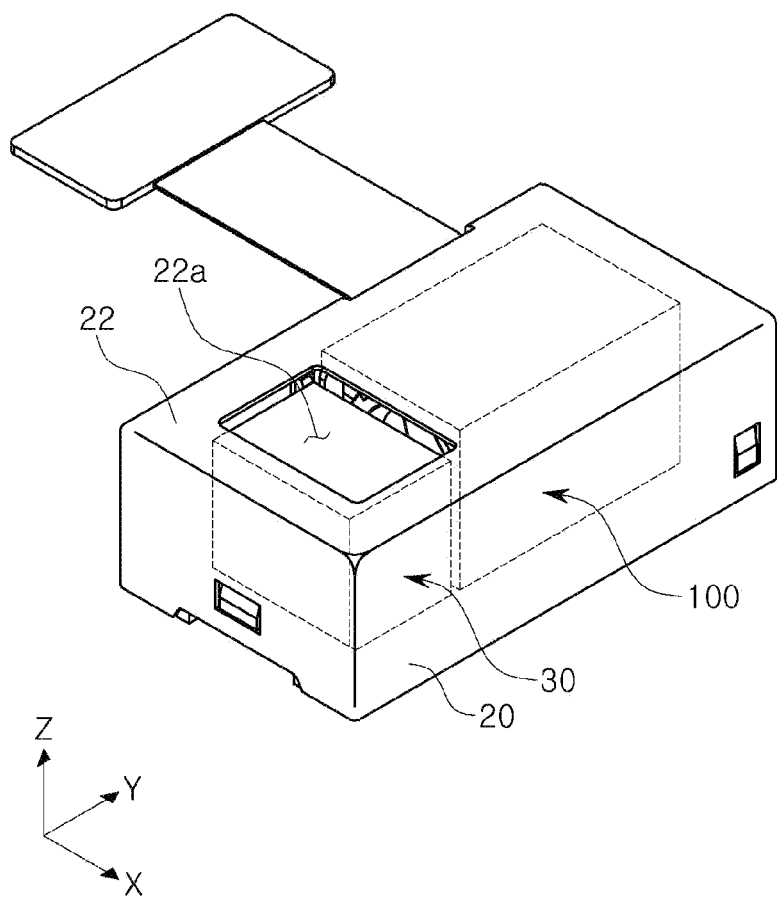
FIG. 2 is a schematic perspective view illustrating a camera module according to one or more example embodiments of the present disclosure.

FIG. 2 is a schematic perspective view illustrating a camera module according to one or more example embodiments of the present disclosure.

Referring to FIG. 2, the camera module 10 according to the example embodiment of the present disclosure may include a reflecting module 30, a lens module 100, and an image sensor module (not illustrated) provided in a housing 20.

The reflecting module 30 may change a moving direction of light. As an example, a moving direction of light incident through an opening 22a of a cover 22 covering the camera module 10 above the camera module 10 may be changed through the reflecting module 30 so that the light is directed toward the lens module 100. To this end, the reflecting module 30 may include a reflecting member (not illustrated) reflecting the light or a refracting member (not illustrated).

A path of the light incident through the opening 22a may be changed by the reflecting module 30 so that the light is directed toward the lens module 100. For example, a path of light incident to the camera module 10 in a thickness direction (a Z-axis direction) of the camera module 10 may be changed by the reflecting module 30 to approximately coincide with an optical axis direction (a Y-axis direction).

The lens module 100 may include a plurality of lenses through which the light whose moving direction is changed by the reflecting module 30 passes, and the image sensor module may include an image sensor (not illustrated) converting the light passing through the plurality of lenses into an electrical signal and a printed circuit board (not illustrated) on which the image sensor is mounted. In addition, the image sensor module may include an optical filter (not illustrated) filtering the light incident from the lens module 100 thereto. The optical filter (not illustrated) may be an infrared cut-off filter.

In an internal space of the housing 20, the reflecting module 30 may be provided in front of the lens module 100 and the image sensor module may be provided behind the lens module 100.

Figure 3:
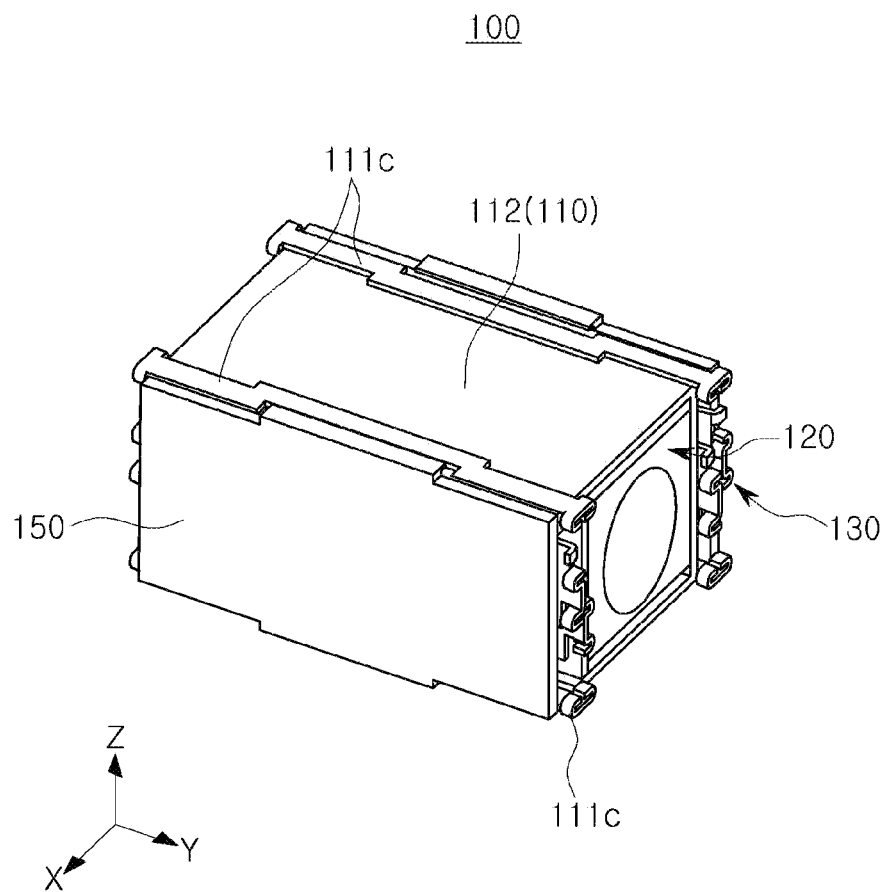
FIG. 3 is a perspective view of a lens module according to one or more example embodiments of the present disclosure.
Figure 4:
FIG. 4 is an exploded perspective view illustrating the lens module according to one or more example embodiments of the present disclosure.

FIG. 3 is a perspective view of the lens module according to one or more example embodiments of the present disclosure, and FIG. 4 is an exploded perspective view illustrating the lens module according to one or more example embodiments of the present disclosure.

Referring to FIGS. 3 and 4, as an example, the lens module 100 according to one or more example embodiments of the present disclosure may include a carrier 110, a lens unit 120, a lens guide unit 130, a driving wire 140, and a cover member 150.

The carrier 110 may have an internal space, and the lens unit 120 may be disposed in the internal space of the carrier 110. As an example, the carrier 110 may have a substantially rectangular parallelepiped box shape in which both ends are opened. The carrier 110 may include a bottom plate 111, a cover plate 112 disposed to face the bottom plate 111, and an auxiliary guide member 113 disposed in a length direction of the carrier 110, for example, the Y-axis direction, and having an auxiliary guide hole 113a. As an example, the auxiliary guide member 113 may be detachably installed on at least one side of each of the bottom plate 111 and the cover plate 112. In addition, the auxiliary guide hole 113a may be disposed at a central portion of the auxiliary guide member 113 in a length direction. In addition, the auxiliary guide member 113 may include a step portion 113b protruding to reduce friction with a guide member 132 of the lens guide unit 130 to be described below.

In addition, both ends of the carrier 110 may be open.

The bottom plate 111 may include a support portion 111a on which the lens unit 120 is disposed, and a mounting portion 111b extending from both sides of the support portion 111a and installed with an installation bar 111c to which the driving wire 140 is connected.

Meanwhile, the cover plate 112 may also include a mounting portion 112b installed with the installation bar 111c to which the driving wire 140 is connected.

Meanwhile, FIG. 4 illustrates a state where one auxiliary guide member 113 is installed at the bottom plate 111 and the cover plate 112 and a state where the other auxiliary guide member 113 is separated from the bottom plate 111 and the cover plate 112, but all of the two auxiliary guide members 113 disposed to face each other may be detachably installed to the bottom plate 111 and the cover plate 112.

Here, terms with respect to directions will be defined. A thickness direction of the carrier 110 refers to the Z-axis direction illustrated in FIGS. 3 and 4, a length direction of the carrier 110 refers to the Y-axis direction illustrated in FIGS. 3 and 4, and a width direction of the carrier 110 refers to the X-axis direction illustrated in FIGS. 3 and 4.

The lens unit 120 may include a plurality of lens groups and may be installed in the carrier 110 to be disposed in the internal space of the carrier 110. As an example, the lens unit 120 may include a first lens group 121 fixed and installed on one side of the carrier 110, a second lens group 122 disposed on one side of the first lens group 121 and movably installed in the carrier 110, and a third lens group 123 disposed on one side of the second lens group 122 and movably installed in the carrier 110.

Meanwhile, the second and third lens groups 122 and 123 may be connected to the lens guide unit 130 to be moved in the Y-axis direction. To this end, the second and third lens groups 122 and 123 may have coupling protrusions 122a and 123a, respectively, to be connected to the lens guide unit 130. Meanwhile, the coupling protrusions 122a and 123a may be disposed to penetrate through the auxiliary guide hole 113a. As described above, the coupling protrusions 122a and 123a are disposed to be moved along the auxiliary guide hole 113a, such that it is possible to prevent the second and third lens groups 122 and 123 from being moved in the Z-axis direction. Accordingly, the second and third lens groups 122 and 123 may be more stably moved in the Y-axis direction.

In addition, at least one of the first, second, and third lens groups 121, 122, and 123 constituting the lens unit 120 may include a plurality of lenses.

The lens guide unit 130 may include a plurality of guide members 132 arranged on each of both side surfaces of the lens groups 121, 122, and 123 to guide movement of at least two lens groups 122 and 123 of the plurality of lens groups 121, 122, and 123. That is, the lens guide unit 130 may be connected to the lens unit 120 to serve to guide movement of some lens groups constituting the lens unit 120, that is, movement of the second and third lens groups 122 and 123. The guide member 132 of the lens guide unit 130 may include a first guide member 132a disposed on one side surface of each of the second and third lens groups 122 and 123, a second guide member 132b disposed to be overlapped with the first guide member 132a, a third guide member 132c disposed on the other side surface of each of the second and third lens groups 122 and 123, and a fourth guide member 132d disposed to be overlapped with the third guide member 132c. In addition, the guide member 132 may have an opening so that the second and third lens groups 122 and 123 may be smoothly moved. Details thereof will be described below.

Meanwhile, the first guide member 132a may have a first inclined guide hole 132a1 disposed to be inclined in one direction and a first opening 132a2 disposed adjacent to the first inclined guide hole 132a1. In addition, the second guide member 132b may be disposed to be inclined in the other direction opposite to the inclined direction of the first inclined guide hole 132a1. The second guide member 132b may have a second inclined guide hole 132b1 disposed to face the first opening 132a2 and a second opening 132b2 disposed to face the first inclined guide hole 132a1.

In addition, the third guide member 132c may have a third inclined guide hole 132c1 disposed to be inclined in one direction and a third opening 132c2 disposed to neighbor the third inclined guide hole 132c1. In addition, the fourth guide member 132d may be disposed to be inclined in the other direction opposite to the inclined direction of the third inclined guide hole 132c1. The fourth guide member 132d may have a fourth inclined guide hole 132d1 disposed to face the third opening 132c2 and a fourth opening 132d2 disposed to face the third inclined guide hole 132c1.

As an example, the coupling protrusions 122a of the second lens group 122 may penetrate through the auxiliary guide holes 113a to be disposed in the first and third inclined guide holes 132a1 and 132c1 and the second and fourth openings 132b2 and 132d2. Accordingly, the coupling protrusions 122a may be moved along the first and third inclined guide holes 132a1 and 132c1 while being moved along the auxiliary guide holes 113a according to ascending and descending of the first and third guide members 132a and 132c and may be disposed in the second and fourth openings 132b2 and 132d2, such that the coupling protrusions 122a may not be subject to interference by the second and fourth guide members 132b and 132d. Therefore, the second lens group 122 may be more stably moved. In other words, the second lens group 122 may be smoothly moved in the length direction of the carrier 110, that is, in only the Y-axis direction without interference by the second and fourth guide members 132b and 132d.

In addition, the coupling protrusions 123a of the third lens group 123 may penetrate through the auxiliary guide holes 113a to be disposed in the second and fourth inclined guide holes 132b1 and 132d1 and the first and third openings 132a2 and 132c2. Accordingly, the coupling protrusions 123a may be moved along the second and fourth inclined guide holes 132b1 and 132d1 while being moved along the auxiliary guide holes 113a according to ascending and descending of the second and fourth guide members 132b and 132d and may be disposed in the first and third openings 132a2 and 132c2, such that the coupling protrusions 123a may not be subject to interference by the first and third guide members 132a and 132c. Therefore, the third lens group 123 may be more stably moved. In other words, the third lens group 123 may be smoothly moved in the length direction of the carrier 110, that is, in only the Y-axis direction without interference by the first and third guide members 132a and 132c.

Further, both ends of each of the first to fourth guide members 132a, 132b, 132c, and 132d may include connection clips 132a4, 132b4, 132c4, and 132d4 provided to prevent separation from the carrier 110 and connected to the driving wires 140. For example, the connection clips 132a4, 132b4, 132c4, and 132d4 may have structures that form connection holes or partial holes in which ends of driving wires 140 may be inserted to connect the first to fourth guide members 132a, 132b, 132c, and 132d to the driving wires 140. For example, the connection clips 132a4, 132b4, 132c4, and 132d4 may extend in a direction toward the carrier 110 or toward the cover member 150 to prevent separation from the carrier 110. The connection clips 132a4, 132b4, 132c4, and 132d4 may be hooks, claws, eyelets, crimped portions, molded portions, other types of fasteners, or the like, and combinations thereof. As an example, two connection clips 132a4, 132b4, 132c4, and 132d4 may be provided to be vertically arranged at one end of each of the first to fourth guide members 132a, 132b, 132c, and 132d. The connection clips 132a4 and 132c4 of the first and third guide members 132a and 132c may be supported by both ends of the carrier 110, and the connection clips 132b4 and 132d4 of the second and fourth guide members 132b and 132d may be supported by both ends of the cover member 150.

Meanwhile, each of the first and third guide members 132a and 132c may be connected to the second lens group 122 to guide movement of the second lens group 122, and each of the second and fourth guide members 132b and 132d may be connected to the third lens group 123 to guide movement of the third lens group 123.

That is, each of the moving lens groups 122 and 123 may be connected to the first and third guide members 132a and 132c and the second and fourth guide members 132b and 132d which are a pair of guide members disposed on both sides of the carrier 110, and may be configured as plural pairs corresponding to the number of moving lens groups. Although the case in which the number of moving lens groups 122 and 123 are two has been described in the present example embodiment, the number of guide members may be increased when the number of moving lens groups are increased.

As described above, the second and third lens groups 122 and 123 may be separately moved through the first and third guide members 132a and 132c and the second and fourth guide members 132b and 132d which are a pair of guide members, such that an operation of each of the second and third lens groups 122 and 123 may be more freely adjusted.

The driving wire 140 may generate a driving force for moving the lens unit 120. As an example, four or more driving wires 140 may be connected to each of the guide members 132 and the driving wire 140 may be formed of a shape memory alloy.

The driving wire 140 may include first and second driving wires 140a and 140b disposed to cross each other at an upper end of the first guide member 132a and each having one end connected to the upper end of the first guide member 132a, and third and fourth driving wires 140c and 140d disposed to cross each other below the first and second driving wires 140a and 140b and each having one end connected to a lower end of the first guide member 132a.

In addition, the driving wire 140 may include fifth and sixth driving wires 140e and 140f disposed to cross each other at an upper end of the second guide member 132b and each having one end connected to the upper end of the second guide member 132b, and seventh and eighth driving wires 140g and 140h disposed to cross each other below the fifth and sixth driving wires 140e and 140f and each having one end connected to a lower end of the second guide member 132b.

In addition, the driving wire 140 may include ninth and tenth driving wires 140i and 140j disposed to cross each other at an upper end of the third guide member 132c and each having one end connected to the upper end of the third guide member 132c, and eleventh and twelfth driving wires 140k and 140l disposed to cross each other below the ninth and tenth driving wires 140i and 140j and each having one end connected to a lower end of the third guide member 132c.

Further, the driving wire 140 may include thirteenth and fourteenth driving wires 140m and 140n disposed to cross each other at an upper end of the fourth guide member 132d and each having one end connected to the upper end of the fourth guide member 132d, and fifteenth and sixteenth driving wires 140o and 140p disposed to cross each other below the thirteenth and fourteenth driving wires 140m and 140n and each having one end connected to a lower end of the fourth guide member 132d.

Meanwhile, one ends of the first to sixteenth driving wires 140a to 140p may be connected to the connection clips 132a4, 132b4, 132c4, and 132d4 of the guide members 132 and the other ends of the first to sixteenth driving wires 140a to 140p may be connected to the installation bars 111c of the carrier 110.

As described above, the first to fourth guide members 132a to 132d may ascend and descend according to expansion and contraction of the driving wires 140 formed of the shape memory alloy, and the second and third lens groups 122 and 123 of the lens unit 120 may thus be moved in the carrier 110 in the Y-axis direction.

The cover member 150 may be coupled to a front surface and a rear surface of the carrier 110 and may have a plate shape. As an example, both ends of the cover member 150 may be in contact with the connection clips 132b4 and 132d4 of the second and fourth guide members 132b and 132d and may serve to guide the ascending and descending of the second and fourth guide members 132b and 132d. In addition, the cover member 150 may have a protrusion portion 152 for reducing a contact area with each of the second and fourth guide members 132b and 132d when the second and fourth guide members 132b and 132d ascend and descend.

As described above, a movement distance of each of the second and third lens groups 122 and 123 may be increased, such that deterioration in image quality in a high-magnification zoom function may be prevented.

In addition, the second and third lens groups 122 and 123 may be moved through the driving wires 140, such that the lens module 100 may be miniaturized and thinned.

Further, the movement of the second and third lens groups 122 and 123 may be guided through the auxiliary guide members 113 of the carrier 110 and the lens guide unit 130, such that the second and third lens groups 122 and 123 may be stably moved.

In addition, the second and third lens groups 122 and 123 may be more smoothly moved through the openings provided in the guide members 132.

Further, the lens guide unit 130 may be vertically moved through the driving wires 140 to move the second and third lens groups 122 and 123 in an incident direction of light. Accordingly, the movement distance of each of the second and third lens groups 122 and 123 may be sufficiently secured through the driving wires 140 formed of the shape memory alloy with a limited displacement, such that the deterioration in image quality in the high-magnification zoom function may be prevented.

Hereinafter, an operation of the lens module according to one or more example embodiments of the present disclosure will be described with reference to the drawings.

FIGS. 5 through 18 are views describing the operation of the lens module according to one or more example embodiments of the present disclosure.

Figure 5:
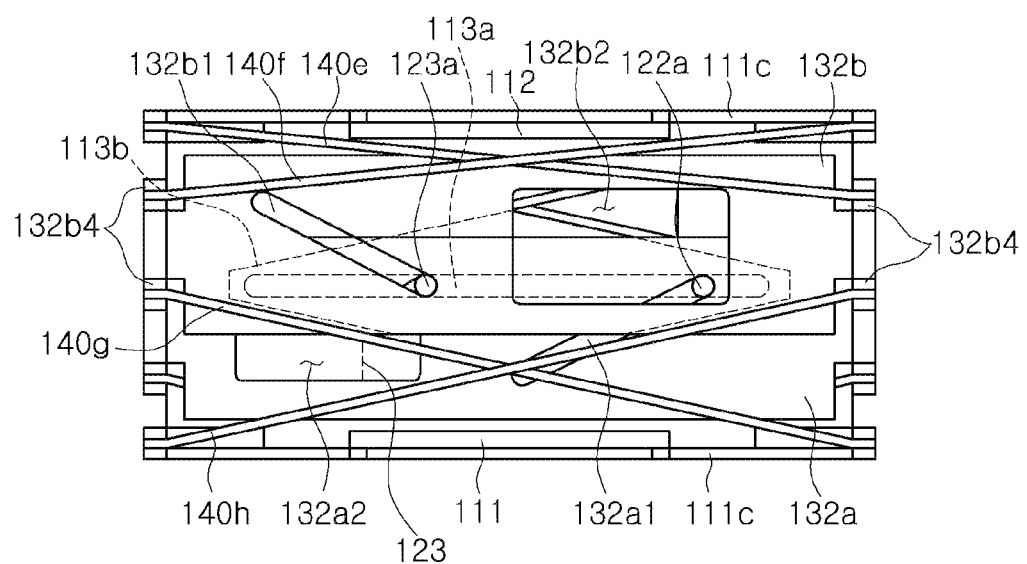
FIGS. 5 through 18 are views describing an operation of the lens module according to one or more example embodiments of the present disclosure.
Figure 6:
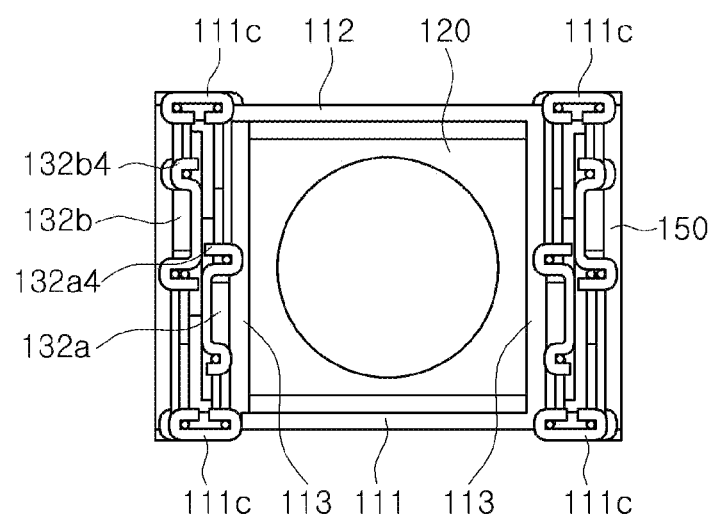

First, the operation of the lens module at the time of performing autofocusing will be described with reference to FIGS. 5 through 10. As illustrated in FIGS. 5 and 6, when power is not supplied to the driving wires 140, a lower surface of the first guide member 132a may be disposed adjacent to the bottom plate 111 of the carrier 110, and an upper surface of the second guide member 132b may be disposed to be adjacent to or in contact with the cover plate 112 of the carrier 110. In addition, in this case, the second lens group 122 may be disposed adjacent to the first lens group 121 (see FIG. 4). Further, the coupling protrusion 122a of the second lens group 122 may penetrate through the auxiliary guide hole 113a of the auxiliary guide member 113 and may be disposed at one end of the first inclined guide hole 132a1 of the first guide member 132a, and a distal end of the coupling protrusion 122a of the second lens group 122 may be disposed in the second opening 132b2 of the second guide member 132b. In addition, the coupling protrusion 123a of the third lens group 123 may penetrate through the auxiliary guide hole 113a of the auxiliary guide member 113, may be disposed at one end of the second inclined guide hole 132b1 of the second guide member 132b, and may be disposed in the first opening 132a2 of the first guide member 132a.

Figure 7:
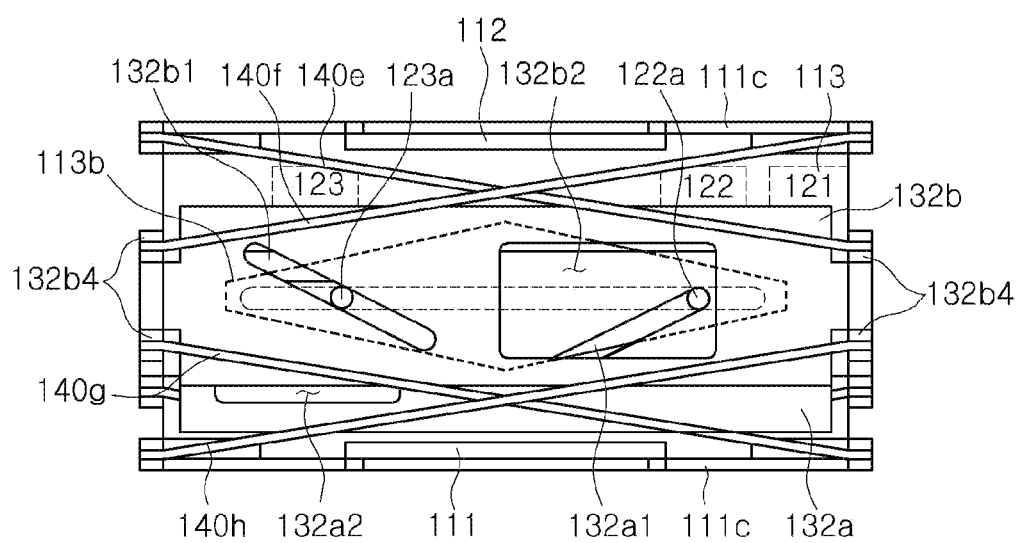
Figure 8:
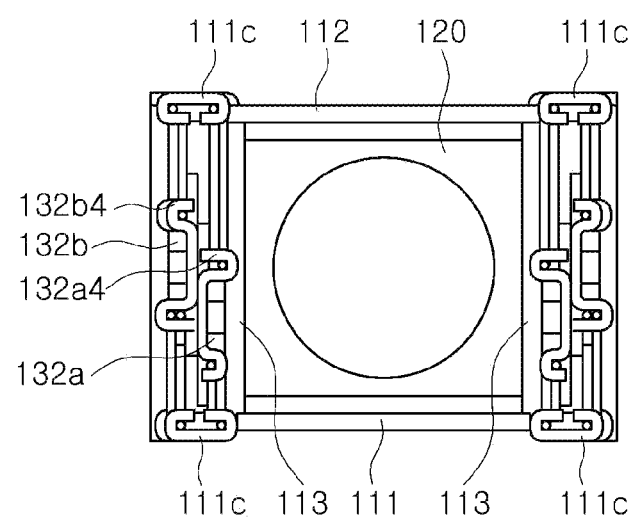

Thereafter, when power is supplied to each of the fifth to eighth driving wires 140e to 140h among the driving wires 140, the fifth and sixth wires 140e and 140f may be expanded, and the seventh and eighth driving wires 140g and 140h may be contracted. Accordingly, the second guide member 132b may be moved downwardly, and the first guide member 132a may be maintained at the original position. Thereafter, as illustrated in FIGS. 7 and 8, the second guide member 132b may be disposed at a central portion of the carrier 110, that is, at a central portion of the carrier 110 in the Z-axis direction. In this case, the coupling protrusion 123a of the third lens group 123 may be disposed at a central portion of the second inclined guide hole 132b1 of the second guide member 132b. In addition, when the third lens group 123 is moved, the coupling protrusion 123a of the third lens group 123 may be moved along the auxiliary guide hole 113a of the auxiliary guide member 113. Meanwhile, the second opening 132b2 may be provided in the second guide member 132b, such that the second guide member 132b may not be subject to interference by the coupling protrusion 122a of the second lens group 122 even when the second guide member 132b descends.

Figure 9:
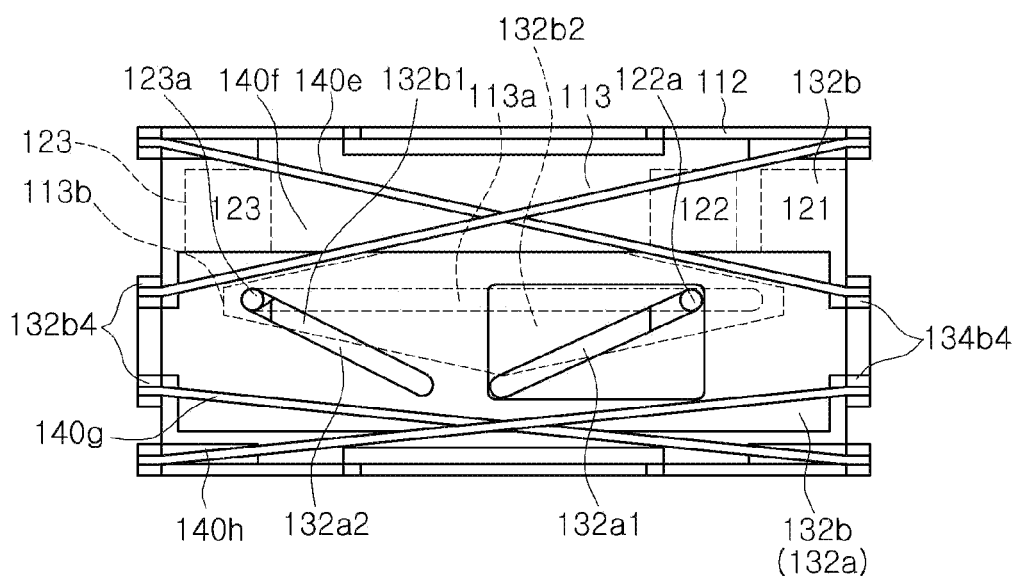
Figure 10:
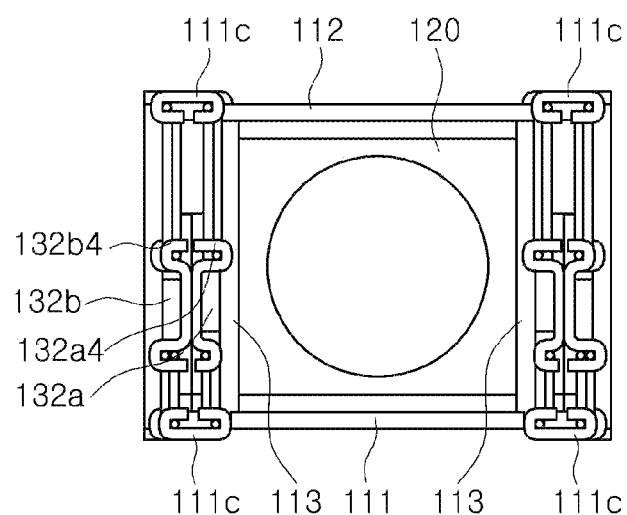

Thereafter, when power is continuously supplied to the driving wires 140, the fifth and sixth driving wires 140e and 140f may be continuously expanded, and the seventh and eighth driving wires 140g and 140h may be continuously contracted. Accordingly, as illustrated in FIGS. 9 and 10, a lower surface of the second guide member 132b may be disposed adjacent to the bottom plate 111 of the carrier 110, and the first and second guide members 132a and 132b may be disposed to be overlapped with each other. In this case, the coupling protrusion 123a of the third lens group 123 may be disposed at the other end of the second inclined guide hole 132b1 of the second guide member 132b, and may be disposed at a distal end of the auxiliary guide hole 113a of the auxiliary guide member 113. In addition, the second opening 132b2 may be provided in the second guide member 132b, such that the second guide member 132b may not be subject to interference by the coupling protrusion 122a of the second lens group 122 even when the second guide member 132b continuously descends.

As described above, the second opening 132b2 may be provided in the second guide member 132b, such that the second guide member 132b may not be subject to interference by the coupling protrusion 122a of the second lens group 122 when the second guide member 132b ascends and descends. Further, the coupling protrusion 123a of the third lens group 123 may penetrate through the auxiliary guide hole 113a of the auxiliary guide member 113 and may be moved along the auxiliary guide hole 113a, such that it is possible to prevent the third lens group 123 from being moved in the Z-axis direction.

Meanwhile, although the operation of the second guide member 132b has been described above, the fourth guide member 132d may also be operated in the same manner as that of the second guide member 132b. Further, the thirteenth to sixteenth driving wires 140m to 140p connected to the fourth guide member 132*d* may also be operated in the same manner as those of the fifth to eighth driving wires 140*e* to 140*h*.

Hereinafter, an operation of the lens module at the time of zooming will be described.

First, as illustrated in FIGS. 5 and 6, when power is not supplied to the driving wires 140, the lower surface of the first guide member 132*a* may be disposed adjacent to the bottom plate 111 of the carrier 110, and the upper surface of the second guide member 132*b* may be disposed to be adjacent to or in contact with the cover plate 112 of the carrier 110. In addition, in this case, the second lens group 122 may be disposed adjacent to the first lens group 121 (see FIG. 4).

Figure 11:
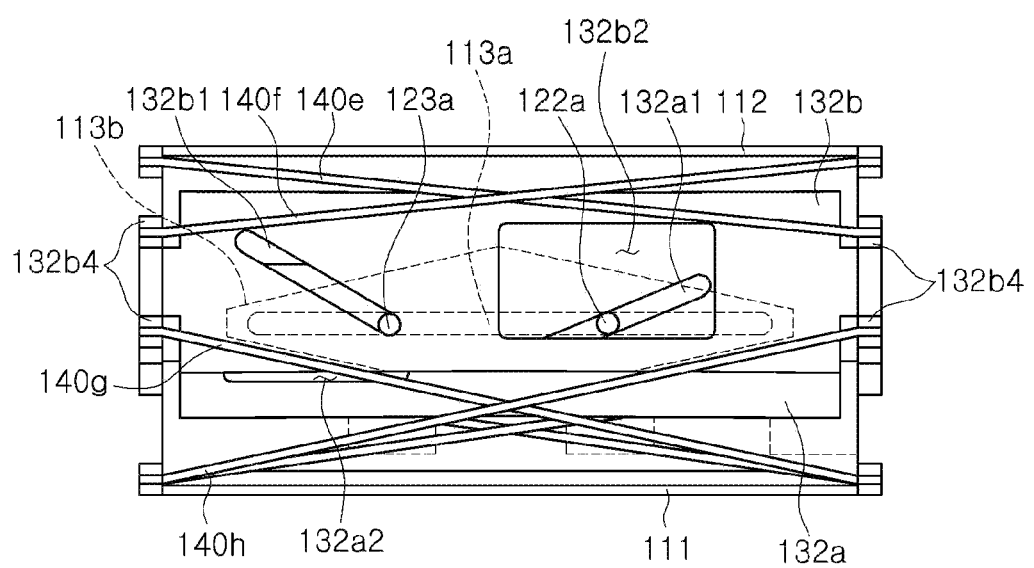
Figure 12:
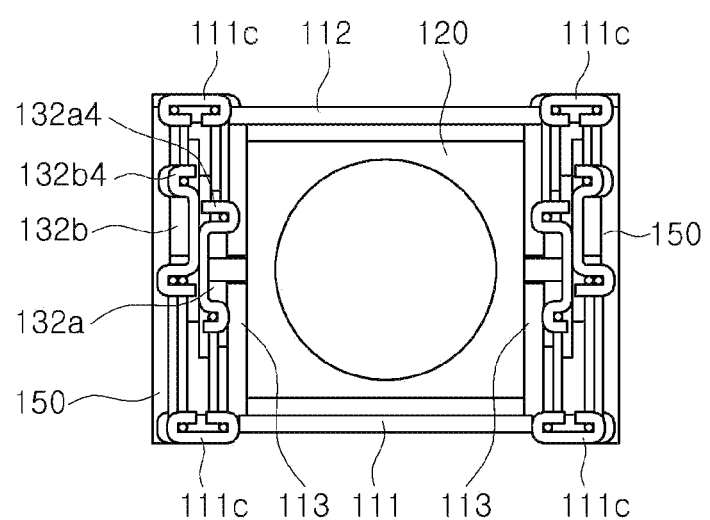

Thereafter, when power is supplied to each of the first to fourth driving wires 140*a* to 140*d* among the driving wires 140, the first and second driving wires 140*a* and 140*b* may be contracted and the third and fourth driving wires 140*c* and 140*d* may be expanded. Accordingly, the first guide member 132*a* may be moved upwardly, and the second guide member 132*b* may be maintained at the original position. Therefore, the second lens group 122 may be spaced apart from the first lens group 121. Thereafter, as illustrated in FIGS. 11 and 12, the first guide member 132*a* may be disposed at the central portion of the carrier 110, that is, at the central portion of the carrier in the Z-axis direction. In this case, the coupling protrusion 122*a* of the second lens group 122 may be disposed at a central portion of the first inclined guide hole 132*a*1 of the first guide member 132*a*. In addition, when the second lens group 122 is moved, the coupling protrusion 122*a* of the second lens group 122 may be moved along the auxiliary guide hole 113*a* of the auxiliary guide member 113. Meanwhile, the first opening 132*a*2 may be provided in the first guide member 132*a*, such that the first guide member 132*a* may not be subject to interference by the coupling protrusion 123*a* of the third lens group 123 even when the first guide member 132*a* ascends.

Figure 13:
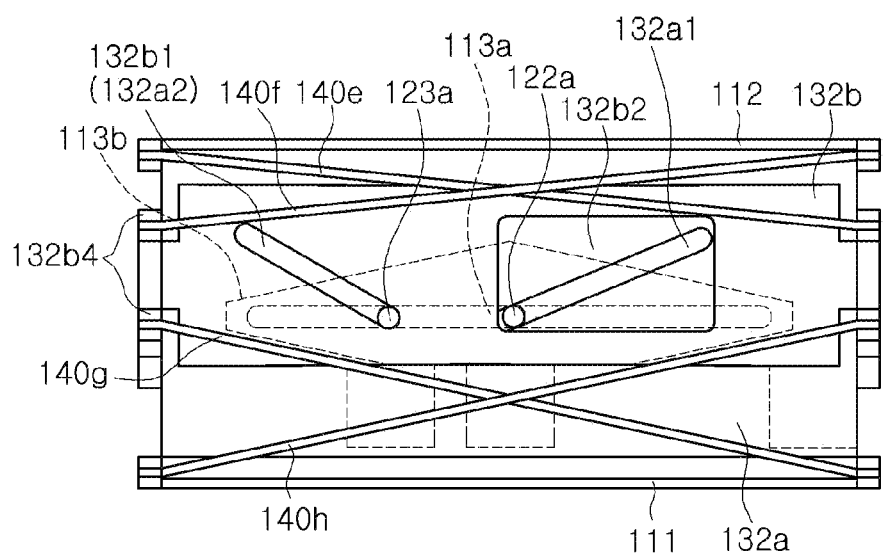
Figure 14:
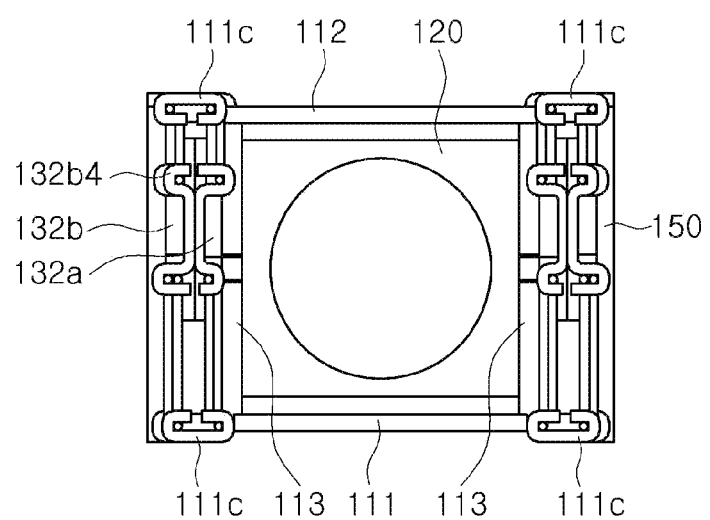

Thereafter, when power is continuously supplied to the driving wires 140, the first and second driving wires 140*a* and 140*b* may be continuously contracted, and the third and fourth driving wires 140*c* and 140*d* may be continuously expanded. Accordingly, as illustrated in FIGS. 13 and 14, an upper surface of the first guide member 132*a* may be disposed adjacent to the cover plate 112 of the carrier 110, and the first and second guide members 132*a* and 132*b* may be disposed to be overlapped with each other. In this case, the coupling protrusion 122*a* of the second lens group 122 may be disposed at the other end of the first inclined guide hole 132*a*1 of the first guide member 132*a*, and may be disposed at a central portion of the auxiliary guide hole 113*a* of the auxiliary guide member 113. In addition, the first opening 132*a*2 may be provided in the first guide member 132*a*, such that the first guide member 132*a* may not be subject to interference by the coupling protrusion 123*a* of the third lens group 123 even when the first guide member 132*a* continuously ascends and descends.

Meanwhile, although the operation of the first guide member 132*a* has been described above, the third guide member 132*c* may also be operated in the same manner as that of the first guide member 132*a*. Further, the ninth to twelfth driving wires 140*i* to 140*l* connected to the third guide member 132*c* may also be operated in the same manner as those of the first to fourth driving wires 140*a* to 140*d*.

Hereinafter, an operation of the lens module when zooming and autofocusing are simultaneously performed will be described.

As illustrated in FIGS. 5 and 6, when power is not supplied to the driving wires 140, the lower surface of the first guide member 132*a* may be disposed adjacent to the bottom plate 111 of the carrier 110, and the upper surface of the second guide member 132*b* may be disposed to be adjacent to or in contact with the cover plate 112 of the carrier 110. In addition, in this case, the second lens group 122 may be disposed adjacent to the first lens group 121 (see FIG. 4). Further, the coupling protrusions 122*a* and 123*a* of the second and third lens groups 122 and 123 may penetrate through the auxiliary guide hole 113*a* of the auxiliary guide member 113 and may be disposed at one end of the first and one end of the second inclined guide holes 132*a*1 and 132*b*1 of the first and second guide members 132*a* and 132*b*, respectively. In addition, the coupling protrusion 122*a* of the second lens group 122 may be disposed in the second opening 132*b*2 of the second guide member 132*b*, and the coupling protrusion 123*a* of the third lens group 123 may be disposed in the first opening 132*a*2 of the first guide member 132*a*.

Figure 15:
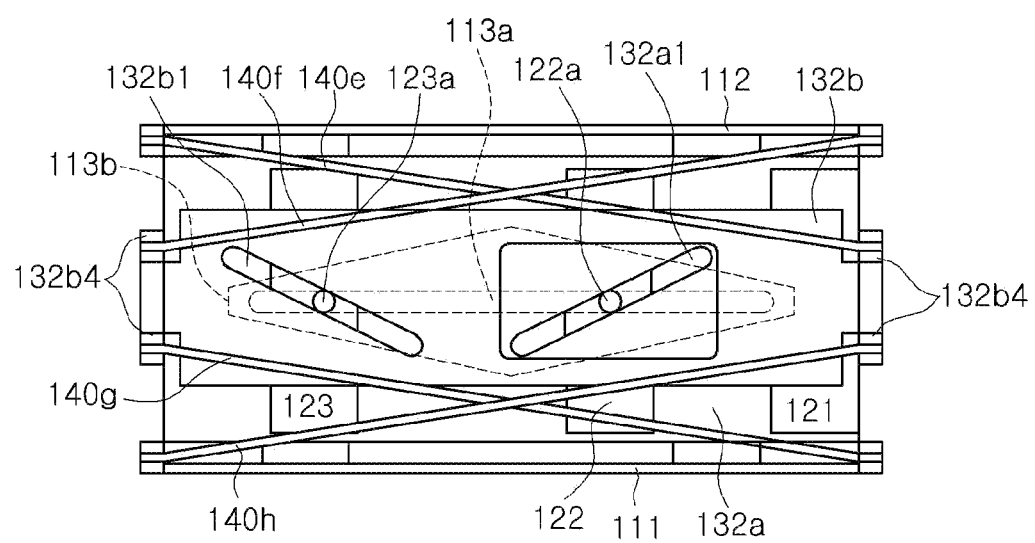
Figure 16:
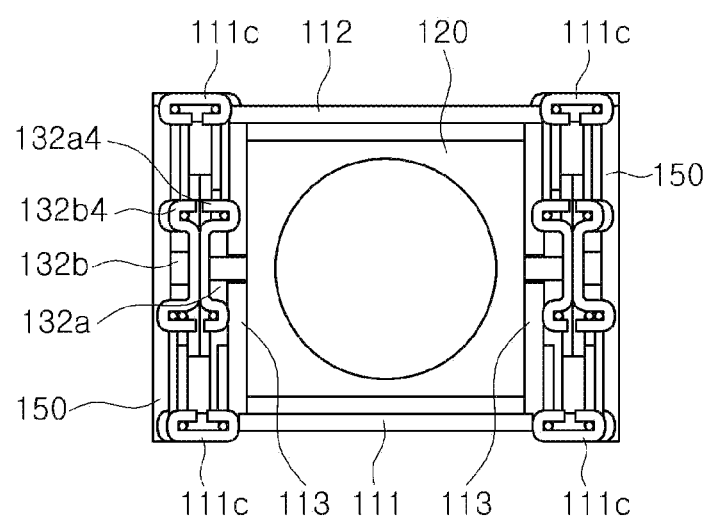

Thereafter, when power is supplied to the driving wires 140, the first and second driving wires 140*a* and 140*b* may be contracted, and the third and fourth driving wires 140*c* and 140*d* may be expanded. Accordingly, the first guide member 132*a* may be moved upwardly. In addition, the fifth and sixth driving wires 140*e* and 140*f* may be expanded and the seventh and eighth driving wires 140*g* and 140*h* may be contracted. Accordingly, the second guide member 132*b* may be moved downwardly. Thereafter, as illustrated in FIGS. 15 and 16, the first and second guide members 132*a* and 132*b* may be disposed to be overlapped with each other at the same height. In this case, the coupling protrusions 122*a* and 123*a* of the second and third lens groups 122 and 123 may be disposed at central portions of the first and second inclined guide holes 132*a*1 and 132*b*1 of the first and second guide members 132*a* and 132*b*. In addition, the coupling protrusions 122*a* and 123*a* of the second and third lens groups 122 and 123 may be moved along the auxiliary guide hole 113*a* of the auxiliary guide member 113.

Meanwhile, the first opening 132*a*2 may be provided in the first guide member 132*a*, such that the first guide member 132*a* may not be subject to interference by the coupling protrusion 123*a* of the third lens group 123 even when the first guide member 132*a* ascends. In addition, the second opening 132*b*2 may be provided in the second guide member 132*b*, such that the second guide member 132*b* may not be subject to interference by the coupling protrusion 122*a* of the second lens group 122 even when the second guide member 132*b* descends.

Figure 17:
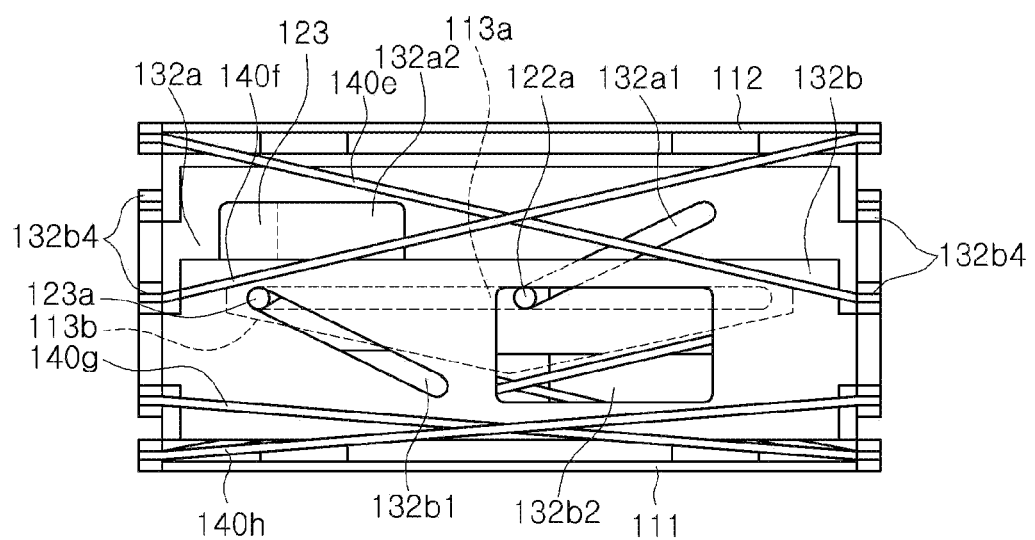
Figure 18:
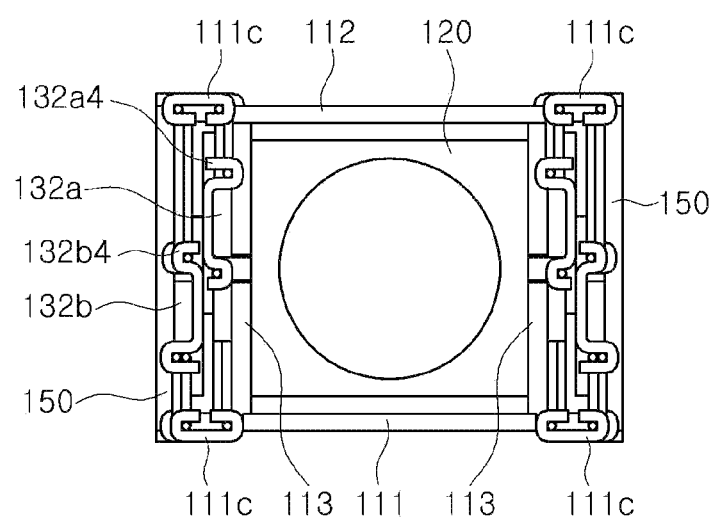

Thereafter, when power is continuously supplied to the driving wires 140, the first and second driving wires 140*a* and 140*b* may be continuously contracted, and the third and fourth driving wires 140*c* and 140*d* may be continuously expanded. In addition, the fifth and sixth driving wires 140*e* and 140*f* may be continuously expanded and the seventh and eighth driving wires 140*g* and 140*h* may be continuously contracted. Accordingly, as illustrated in FIGS. 17 and 18, the lower surface of the second guide member 132*b* may be disposed adjacent to the bottom plate 111 of the carrier 110, and the upper surface of the first guide member 132*a* may be disposed to be adjacent to or in contact with the cover plate 112 of the carrier 110. In this case, the coupling protrusions 122*a* and 123*a* of the second and third lens groups 122 and 123 may be disposed at the other ends of the first and second inclined guide holes 132*a*1 and 132*b*1 of the first and second guide members 132*a* and 132*b*, respectively. In addition, the coupling protrusions 122*a* and 123*a* of the second and third lens groups 122 and 123 may be moved along the auxiliary guide hole 113*a* of the auxiliary guide member 113.

Further, the first opening 132*a*2 may be provided in the first guide member 132*a*, such that the first guide member 132*a* may not be subject to interference by the coupling protrusion 123*a* of the third lens group 123 even when the first guide member 132*a* continuously ascends. In addition, the second opening 132*b*2 may be provided in the second guide member 132*b*, such that the second guide member 132*b* may not be subject to interference by the coupling protrusion 122*a* of the second lens group 122 even when the second guide member 132*b* continuously descends.

As described above, the coupling protrusions 122*a* and 123*a* of the second and third lens groups 122 and 123 may penetrate through the auxiliary guide hole 113*a* of the auxiliary guide member 113 and may be moved along the auxiliary guide hole 113*a*, such that it is possible to prevent the second and third lens groups 122 and 123 from being moved in the Z-axis direction. Further, the first and second openings 132*a*2 and 132*b*2 may be provided in the first and second guide members 132*a* and 132*b*, respectively, such that when the second and third lens groups 122 and 123 are moved, the interference between the coupling protrusion 122*a* and the second guide member 132*b*, and the interference between the coupling protrusion 123*a* and the first guide member 132*a*, may be prevented.

Meanwhile, although the operation of each of the first and second guide members 132*a* and 132*b* has been described above, the third and fourth guide members 132*c* and 132*d* may also be operated in the same manner as those of the first and second guide members 132*a* and 132*b*. That is, the first guide member 132*a* and the third guide member 132*c* may be operated in the same manner, and the second guide member 132*b* and the fourth guide member 132*d* may be operated in the same manner. Further, the ninth to sixteenth driving wires 140*i* to 140*p* connected to the third and fourth guide members 132*c* and 132*d* may also be operated in the same manner as those of the first to eighth driving wires 140*a* to 140*h*.

As described above, the second and third lens groups 122 and 123 may be moved in the length direction (that is, the Y-axis direction) of the carrier 110, such that the movement distance of each of the second and third lens groups 122 and 123 may be increased. As a result, the deterioration in image quality in the high-magnification zoom function may be prevented.

In addition, the second and third lens groups 122 and 123 may be moved through the driving wires 140, such that the lens module 100 may be miniaturized and thinned.

Further, the movement of the second and third lens groups 122 and 123 may be guided through the auxiliary guide member 113 and the lens guide unit 130, such that the second and third lens groups 122 and 123 may be stably moved.

In addition, when the second and third lens groups 122 and 123 are moved through the openings provided in the guide members 132, the interference between the coupling protrusions 122*a* and 123*a* of the second and third lens groups 122 and 123 and the guide members 132 may be prevented.

Further, the lens guide unit 130 may be vertically moved through the driving wire 140 to move the second and third lens groups 122 and 123 in the incident direction of light. Accordingly, the movement distance of each of the second and third lens groups 122 and 123 may be sufficiently secured through the driving wires 140 formed of the shape memory alloy with a limited displacement, such that the deterioration in image quality in the high-magnification zoom function may be prevented.

As set forth above, according to the example embodiments in the present disclosure, the lens may be more smoothly moved.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens module comprising:
   a carrier having an internal space;
   a lens unit including lens groups and installed in the carrier so that at least a first movable lens group and a second movable lens group are independently movable in a length direction of the carrier;
   a guide unit including guide members arranged on both side surfaces of the lens groups to guide movement of the first and second movable lens groups; and
   driving wires connected to each of the guide members and formed of a shape memory alloy,
   wherein each of the movable lens groups is connected to a pair of guide members disposed on both sides of the carrier,
   wherein the carrier comprises an auxiliary guide member having an auxiliary guide hole and disposed on at least one side surface of the lens groups, and
   wherein the first movable lens group and the second movable lens group each comprise a coupling protrusion disposed to penetrate through the auxiliary guide hole of the auxiliary guide member.

2. The lens module of claim 1, wherein the guide members are disposed in pairs corresponding to the number of movable lens groups.

3. The lens module of claim 1, wherein the auxiliary guide hole is disposed parallel to a movement direction of the first and second movable lens groups to guide movement of the first and second movable lens groups.

4. The lens module of claim 1, wherein the guide members include a first guide member disposed on one side surface of the lens groups, a second guide member disposed to be overlapped with the first guide member, a third guide member disposed on the other side surface of the lens groups, and a fourth guide member disposed to be overlapped with the third guide member.

5. The lens module of claim 4, wherein the first guide member has a first inclined guide hole disposed to be inclined in one direction, and the second guide member has a second inclined guide hole disposed to be spaced apart from the first inclined guide hole and disposed to be inclined to an other direction opposite to the inclined direction of the first inclined guide hole, and wherein the first guide member has a first opening disposed to face the second inclined guide hole, and the second guide member has a second opening disposed to face the first inclined guide hole.

6. The lens module of claim 5, wherein the third guide member has a third inclined guide hole disposed to be inclined in one direction, and the fourth guide member has a fourth inclined guide hole disposed to be spaced apart from the third inclined guide hole and disposed to be inclined to an other direction opposite to the inclined direction of the third inclined guide hole, and wherein the third guide member has a third opening disposed to face the fourth inclined guide hole, and the fourth guide member has a fourth opening disposed to face the third inclined guide hole.

7. The lens module of claim 5, wherein each coupling protrusion is disposed in the first inclined guide hole and the second opening or the second inclined guide hole and the first opening, the first opening and the second opening being disposed to face the second inclined guide hole and the first inclined guide hole, respectively.

8. The lens module of claim 4, wherein the driving wires comprise:

first and second driving wires disposed to cross each other at an upper end of the first guide member and each having one end connected to the upper end of the first guide member, and third and fourth driving wires disposed to cross each other below the first and second driving wires and each having one end connected to a lower end of the first guide member;

fifth and sixth driving wires disposed to cross each other at an upper end of the second guide member and each having one end connected to the upper end of the second guide member, and seventh and eighth driving wires disposed to cross each other below the fifth and sixth driving wires and each having one end connected to a lower end of the second guide member;

ninth and tenth driving wires disposed to cross each other at an upper end of the third guide member and each having one end connected to the upper end of the third guide member, and eleventh and twelfth driving wires disposed to cross each other below the ninth and tenth driving wires and each having one end connected to a lower end of the third guide member; and thirteenth and fourteenth driving wires disposed to cross each other at an upper end of the fourth guide member and each having one end connected to the upper end of the fourth guide member, and fifteenth and sixteenth driving wires disposed to cross each other below the thirteenth and fourteenth driving wires and each having one end connected to a lower end of the fourth guide member.

9. The lens module of claim 8, wherein each of the first to fourth guide members guides the movement of the first and second movable lens groups while ascending and descending in a vertical direction of the carrier.

10. The lens module of claim 4, wherein the carrier comprises a bottom plate and a cover plate disposed to face the bottom plate, and each of the bottom plate and the cover plate includes a mounting portion installed with an installation bar to which ends of the driving wires are connected.

11. The lens module of claim 10, wherein one end of each driving wire is connected to a corresponding connection hole provided in one of the first to fourth guide members, and an other end of the driving wire is connected to a corresponding installation bar.

12. The lens module of claim 4, wherein the lens groups comprise:

a fixed lens group fixed and installed on one side of the carrier, wherein the first movable lens group is disposed behind the fixed lens group and movable in an incident direction of light; and the second movable lens group is disposed behind the second lens group and movable.

13. The lens module of claim 12, wherein the first movable lens group is connected to the first and third guide members and movable in the length direction of the carrier according to ascending and descending of the first and third guide members, and wherein the second movable lens group is connected to the second and fourth guide members and movable in the length direction of the carrier according to ascending and descending of the second and fourth guide members.

14. The lens module of claim 1, wherein the auxiliary guide member is detachably installed to the carrier.

15. The lens module of claim 1, further comprising cover members coupled to the carrier to be disposed on the both side surfaces of the lens groups.

16. The lens module of claim 15, wherein the cover members each comprise a protrusion portion for reducing a contact area with the guide members when the guide members ascend and descend.

17. A camera module comprising:

a reflecting module configured to change a path of incident light; and the lens module of claim 1 through which the light whose path is changed by the reflecting module passes.

18. A portable electronic device comprising:

front and rear major surfaces facing each other in a thickness direction of the portable electronic device; and two or more camera modules, one or more of which is the camera module of claim 17, wherein the lens groups of the one or more camera modules of claim 17 are disposed along an optical axis perpendicular to the thickness direction.

19. A lens module comprising:

a carrier;

a lens group disposed in the carrier and movable in an optical axis direction relative to the carrier;

guide members disposed on opposing sides of the carrier connected to the lens group; and driving wires comprised of shape memory alloy and connected to the carrier and the guide members to drive the guide members in a direction crossing the optical axis direction, wherein the lens group moves in the optical axis direction in response to the guide members driven in the direction crossing the optical axis direction, wherein the carrier comprises an auxiliary guide member having an auxiliary guide hole and disposed on at least one side surface of the lens group, and wherein the lens group comprises a coupling protrusion disposed to penetrate through the auxiliary guide hole of the auxiliary guide member.

* * * * *